United States Patent [19]
Selman, Jr.

[11] Patent Number: 4,457,666
[45] Date of Patent: Jul. 3, 1984

[54] APPARATUS AND METHOD FOR DERIVING ENERGY FROM A MOVING GAS STREAM

[75] Inventor: W. Robertson Selman, Jr., Houston, Tex.

[73] Assignee: The Windgrabber Corporation, Houston, Tex.

[21] Appl. No.: 368,419

[22] Filed: Apr. 14, 1982

[51] Int. Cl.³ .............................................. F03D 3/04
[52] U.S. Cl. ..................................... 415/2 R; 415/143; 415/1
[58] Field of Search ........... 415/2 R, 1, 143, 2 A–4 A

[56] References Cited
U.S. PATENT DOCUMENTS

| | | | |
|---|---|---|---|
| 581,311 | 4/1897 | Scovel et al. | 415/2 A |
| 789,993 | 5/1905 | Muntean et al. | 415/2 R X |
| 979,098 | 12/1910 | Scheubeck | 415/2 R |
| 1,225,033 | 5/1917 | Jackson | 415/2 R X |
| 1,463,924 | 8/1923 | Ozaki | 415/2 R |
| 1,519,447 | 12/1924 | Fortier-Beaulieu | 415/2 R X |
| 2,017,961 | 10/1935 | Ferral | 415/2 A |
| 3,793,530 | 2/1974 | Carter | 290/55 |
| 3,876,925 | 4/1975 | Stoeckert | 322/1 |
| 4,018,543 | 4/1977 | Carson | 415/2 |
| 4,021,135 | 5/1977 | Pedersen | 415/2 |
| 4,075,500 | 2/1978 | Oman | 290/55 |
| 4,087,196 | 5/1978 | Kronmiller | 415/2 |
| 4,115,027 | 9/1978 | Thomas | 415/2 |
| 4,116,581 | 9/1978 | Bolie | 415/2 |
| 4,132,499 | 1/1979 | Igra | 415/2 |
| 4,154,556 | 5/1979 | Webster | 415/2 |
| 4,295,783 | 10/1981 | Lebost | 415/2 R |

FOREIGN PATENT DOCUMENTS

| | | | |
|---|---|---|---|
| 463711 | 8/1928 | Fed. Rep. of Germany | 415/4 A |
| 911356 | 9/1956 | Fed. Rep. of Germany | 416/175 A |
| 2545951 | 4/1976 | Fed. Rep. of Germany | 415/2 A |
| 2814356 | 10/1979 | Fed. Rep. of Germany | 415/2 A |
| 529301 | 11/1921 | France | 415/4 A |
| 2305608 | 10/1976 | France | 415/2 R |
| 449753 | 7/1949 | Italy | 415/3 A |
| 548238 | 9/1956 | Italy | 415/2 R |
| 19581 | 6/1899 | Switzerland | 415/2 R |

*Primary Examiner*—Everette A. Powell, Jr.
*Attorney, Agent, or Firm*—Arnold, White & Durkee

[57] ABSTRACT

There is provided a method and device for converting energy from a moving gas stream with improved efficiency. One embodiment of the apparatus includes a frame mounted on a rotatable shaft. The frame has working blades and discharge blades mounted thereon, the arrangement of the discharge blades being sufficient to materially reduce any back pressure on the working blades. Flow control means are operatively connected to the frame for substantially normalizing the flow of the moving gas stream as at impinges on the working and discharge blades.

There is also provided a method of converting a portion of the energy of a moving gas stream to mechanical energy including the steps of arranging a series of working blades on a frame such that a moving gas impinging on the working blades will rotate the frame; arranging a plurality of discharge blades on the frame to materially reduce any back pressure on the working blades when the working blades are exposed to the moving gas and directing the moving gas in a substantially normalized flow pattern to the working and secondary blades.

21 Claims, 3 Drawing Figures

U.S. Patent     Jul. 3, 1984     4,457,666
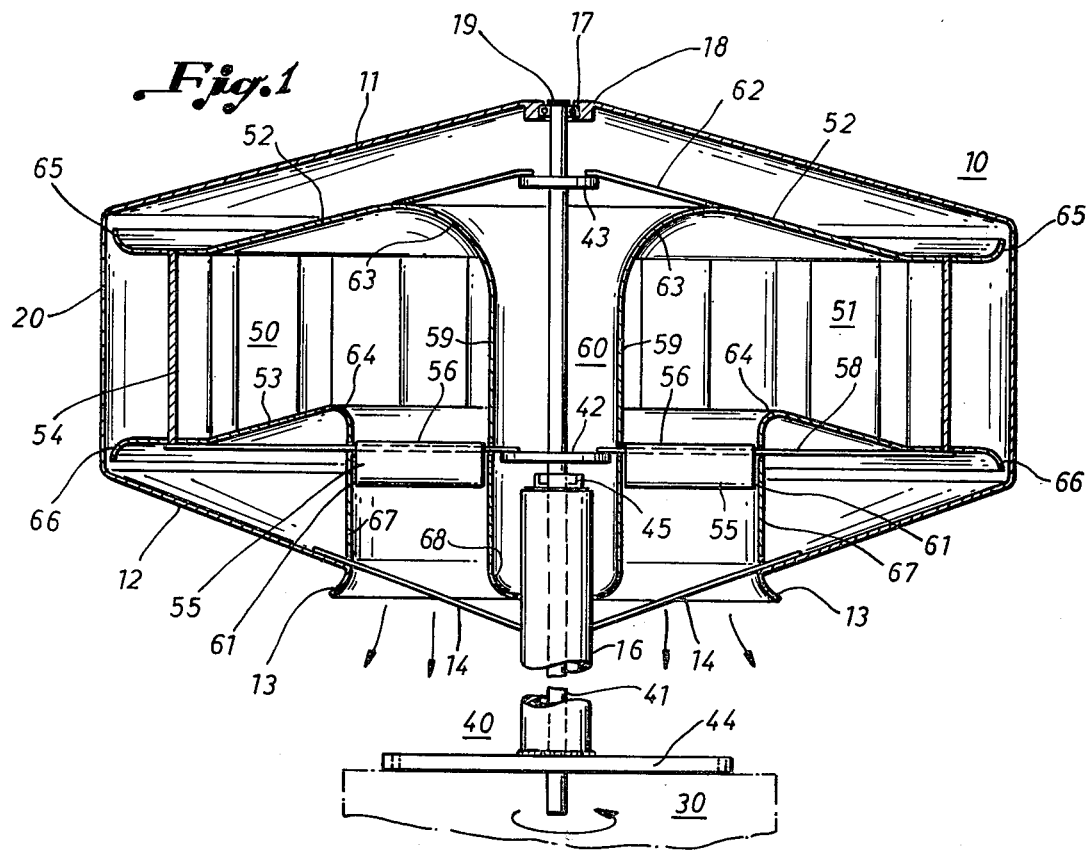
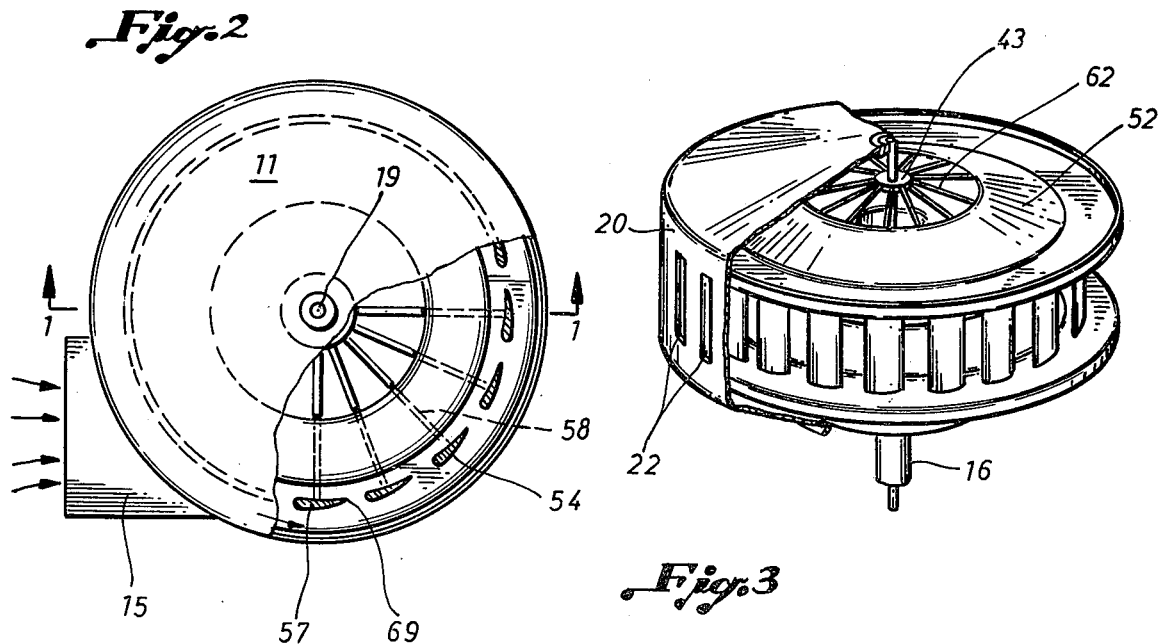

APPARATUS AND METHOD FOR DERIVING ENERGY FROM A MOVING GAS STREAM

This invention relates to an energy generating device and more particularly to an apparatus and method for deriving energy from a moving gas stream.

Windmills have been used to convert wind energy into mechanical energy for over 1000 years. Since the 1700's windmills and other wind machines have undergone various modifications with a view toward improving efficiency and operation. The use of a fantail to keep the blades of a windmill facing into the wind and the use of a shroud to capture and direct airflow are but two examples. Yet, windmills and other wind machines suffer from several limitations, particularly with regard to efficiency. For example, although a windmill can in theory be no more than about 60% efficient, a typical windmill may have a conversion efficiency of only 5%.

The patent literature includes many examples of wind machines. For example, Bolie, U.S. Pat. No. 4,116,581 discloses a wind mill comprising a spherical housing. Horizontal working blades receive a vertically downward airflow directed by the spherical housing and a deflection septum. Back pressure is reduced by suction generated across the exit opening by means of the horizontal wind flow across the lower opening.

Webster, U.S. Pat. No. 4,154,556 discloses a wind powered device using a curved duct with vertical louvre blades at the inlet and a set of helically curved airfoil blades at the outlet of the duct. Vanes guide the airflow through the duct and on to the set of airfoil blades, which are attached to a shaft.

Carter, U.S. Pat. No. 3,793,530, discloses a wind machine with pivotally mounted louvres and horizontal lift wings or blades. When the pivotal louvres are on the leeward side of the rotor, they will swing into an inactive position so that wind impinging on them will not produce a driving force. The lift wings are mounted on the upper end of the rotor. Each of the wings has an elevated leading edge so that the wings will introduce a vertical lifting force to the rotor to support some of its weight.

Carson, U.S. Pat. No. 4,018,543, discloses a housing with a horizontal inlet and a vertical outlet. Horizontal blades are mounted to rotate on a vertical shaft and ducts are used to channel the air into the horizontal blades.

Stockert, U.S. Pat. No. 3,876,925, discloses a wind machine for mounting on a vehicle. A housing is provided with a plurality of openings to thereby direct air into a blade system comprising a series of rotor vanes. The vanes are of a scoop design.

Kronmiller, U.S. Pat. No. 4,087,196, discloses an apparatus for deriving energy from a moving gas stream. The gas stream passes through a passageway thus causing an induction fan and turbine rotor to rotate. The reduction in area of the passage way causes an increase in wind speed. The blades of the turbine rotor are placed at a small pitch angle. In one embodiment, a portion of the rotational energy from the turbine rotor rotates the induction fan in order to add an increment of velocity to the entering gas stream. Alternately, the induction fan may operate from its own power source. Back pressure is reduced due to the configuration of certain exterior wall surfaces.

Pedersen, U.S. Pat. No. 4,021,135, discloses a wind turbine. The wind turbine is equipped with a spoiler located at the periphery of a diverging portion in order to minimize the pressure differential at the outlet. Swirl vanes or vortex generators are also provided upstream of a set of blades to increase and direct airflow upstream of those blades, which are shaped to turn the flow at an angle to the axis of the machine while increasing the relative flow velocity.

Oman, U.S. Pat. No. 4,075,500, discloses a wind powered electrical generating system comprising a duct or shroud within which a wind turbine, having a fixed pitch blade and fixed stator blades, is mounted. The stator blades are placed in front of a turbine blade to vary the air currents and to maintain an optimal airflow. The stators are equipped with hinged flap sections and the duct has a plurality of holes to allow external flow to enter and energize the boundary layer along the wall of the duct.

Igra, U.S. Pat. No. 4,132,499, discloses a wind driven energy generating device comprising a duct with internally mounted rotor blades, while Thomas U.S. Pat. No. 4,115,027, discloses an omnidirectional windmill.

These and other devices and methods suffer from one or more of several limitations. For example, many of the devices fail to sufficiently reduce back pressure on the working blades such that the devices fail to efficiently convert energy at low wind speeds. Still other devices require relatively large diameter blades or blades that are twisted or skewed about their axis in order to operate efficiently. Still other devices must be faced into the wind or gas stream by directional vanes or other means. Yet other devices require straightening vanes to control airflow, while others require a relatively large number of moving parts.

These and other limitations of prior devices and processes are reduced or substantially eliminated by the present invention.

SUMMARY OF THE INVENTION

There is provided an apparatus and method for deriving energy from a moving gas stream. In accordance with one aspect of the present invention there is provided a device for converting energy from a moving gas stream with improved efficiency. A frame is mounted on a rotatable shaft. The frame is equipped with a plenum with an inlet and an outlet. A series of working blades are mounted across the inlet of the plenum, while a series of discharge blades are mounted across the plenum at a location sufficiently downstream of the working blades such that the arrangement of the discharge blades materially reduces any back pressure on the working blades. Flow control means are operatively connected to the frame for directing the flow of the moving gas stream as it impinges on the working blades. The plenum is preferably contoured to direct a normalized flow of gas against the discharge blades. In one embodiment the working and discharge blades are conventional low speed airfoils.

The flow control means may include a housing with one or more ducts which are in communication with the plenum inlet. In accordance with one aspect of the present invention, a plurality of apertures may be selectively located along a portion of the housing in spaced relation to the plenum inlet and plenum outlet for placing the frame in communication with ambient air.

In one embodiment, the plenum inlet is at an angle of approximately 90° with respect to the plenum outlet. Additionally, the plenum outlet faces downward.

In accordance with the present invention there is also provided an apparatus for converting energy from a moving gas stream including a housing having at least one inlet and an outlet in spaced relation to each of the inlets. A shaft is rotatably mounted at one end in the housing. The other end of the shaft is adapted for operative connection to a generator. A generally circular frame is mounted on the shaft such that rotation of the frame rotates the shaft. The frame defines an internal plenum that has a substantially horizontal inlet in communication with each housing inlet and a substantially vertical outlet in communication with the housing outlet. A series of working blades is fixedly mounted across the inlet of the frame for exposure to the moving gas. A series of discharge blades are also fixedly mounted across the plenum, the location and orientation of the discharge blades being fixed in relation to the orientation and location of the working blades as well as the cross-sectional area of each housing inlet and the housing outlet for efficient conversion of the energy of the moving gas stream as it impinges upon the working blades.

In accordance with the present invention there is also provided an improved method of converting a portion of the energy from a moving gas stream including the steps of: arranging a series of working blades on a frame such that a moving gas impinging on the working blades will rotate the frame; arranging a plurality of discharge blades on the frame in order to materially reduce any back pressure on the working blades when the working blades are exposed to a moving gas; and exposing the working blades to the moving gas stream and thereby rotating the frame and causing the discharge blades to rotate such that the discharge blades materially reduce the back pressure within the frame in order to enhance the efficient conversion of the energy in the moving gas stream. The velocity of the moving gas stream directed against the working blades may be as low as three miles per hour. The moving gas may be an exhaust gas, as well as ambient wind currents.

In accordance with the present invention there is also provided an improved method of converting a portion of the energy of a moving gas stream to mechanical energy comprising the steps of: mounting a series of substantially vertical working blades on a substantially cylindrical frame such that a moving gas impinging on the working blades will rotate the frame; mounting a plurality of substantially horizontal discharge blades on the frame; fixedly attaching the frame to a rotatable shaft; and setting the pitch of the vertical and working blades and directing the moving gas in a substantially normalized flow pattern with a uniform velocity profile at an inlet segment of the frame having a specified cross-sectional area whereby the moving gas passes through the working blades, secondary blades and an outlet segment of the frame having a specified cross-sectional area so as to rotate the frame and the shaft and enhance the efficient conversion of the energy in the moving gas stream.

BRIEF DESCRIPTION OF THE DRAWINGS

Various embodiments of the invention will now be described by way of example with reference to the drawings.

FIG. 1 is a cross-sectional elevation view of one embodiment of the present invention taken along line 1—1 of FIG. 2;

FIG. 2 is a partial cut-away plan view of the embodiment shown in FIG. 1; and

FIG. 3 is a cut-away view of a portion of the embodiment shown in FIG. 1.

DESCRIPTION OF THE PREFERRED EMBODIMENT

Referring generally now to FIGS. 1–3, there will be described a method and apparatus for converting the energy of a moving gas stream, such as ambient wind currents or exhaust gases, to other forms of energy. Generally, the apparatus of the present invention includes a blade frame 50 which is enclosed in a housing 10 and which is operatively connected to a shaft mechanism 40. The blade frame 50 defines a plenum or duct 51 with an inlet and an outlet. Working or primary blades 54 are mounted across or near the inlet of the plenum 51, while discharge or secondary blades 55 are mounted either across or at a distance from the outlet of the plenum 51. An inlet duct 15 serves to direct a moving gas through the inlet of the plenum 51 and onto the working blades 54. The secondary blades 55 are arranged so as to generally reduce any back pressure on the working blades 54.

In accordance with one aspect of the present invention, the volume of the plenum 51 is emperically determined while the pitch of the secondary blades 55 and the working blades 54 is optimally balanced to take advantage of particular environmental conditions such as air density, wind velocity and temperature. More particularly, the volume of the plenum as established by the cross-sectional area of the inlet and outlet of the plenum 51, and the contour of the plenum walls may be empirically set in conjunction with the orientation, including pitch, of the working blades 54 and discharge blades 55, such that the discharge blades 55 serve to materially reduce or eliminate back pressure on the working blades 54. For example, if the cross-sectional area of the plenum outlet is reduced in relation to the cross-sectional area of the plenum inlet, the pitch of the discharge blades 55 mounted in the plenum may be increased to insure that any back pressure on the working blades may be dissipated or eliminated. This in turn avoids blade stall throughout the operating range of the machine, particularly at lower wind or gas speeds than otherwise possible and so otherwise enhances the efficiency of the apparatus.

In accordance with another aspect of the present invention flow control means are provided to insure that the working blades 54 and the discharge blades 55 receive a generally normalized flow. For example, the leading edge of upper plenum wall 52 as well as the leading edge of lower plenum wall 53 are provided with arcuate segments 65 and 66, respectively. These arcuate segments aid in channeling the flow of gas against the leading edge of working blades 54. Thus, inlet duct 15 and leading edges 65 and 66 serve as flow control means to direct a normalized flow of moving gas against blades 54.

Somewhat similarly, the walls of plenum 51 may be contoured to ensure that the discharge blades 55 receive a generally normalized flow of moving gas with a substantially uniform velocity profile. Since the flow of gas against the blades 54 and 55 is substantially normalized, the orientation of the blades in relation to the moving gas stream may be more readily and favorably set and the overall efficiency of the device enhanced.

In accordance with another aspect of the present invention, portions of the housing 10 may also serve as flow control means to reduce the tendency of the working blades 54 to drag as the blade frame 50 moves in housing 10. For example the housing 10 may be equipped with a series of slots 22 which are selectively located along a portion of the housing wall 20 in spaced relation to the plenum inlet and plenum outlet. The slots 22 serve to diminish or eliminate the tendency of the working blades 54 to create a vacuum or otherwise create a drag on the rotating blade frame 50 in conjunction with housing wall 20. The presence of properly located slots 22 thus increases the overall efficiency of the device.

In one aspect of the present invention the number of moving parts is preferably minimized. More particularly, in the preferred embodiment shown in FIGS. 1–3, the only moving parts are the shaft 41 and the bearings 17, along with blade frame 50 which is mounted to rotate the shaft 41. This in turn provides several advantages including reduced maintenance and increased working life.

Referring now to FIG. 1, the preferred embodiment of the invention will now be described in more detail. Frame support sleeve 16 is rigidly mounted on a support 44 which in turn is mounted on base 30. Lower housing support rods or spokes 14 are integrally attached at one end to frame support sleeve 16 and extend outwardly therefrom. The other end of the support rods 14 are connected to lower portion or floor 12 of housing 10 such that the housing 10 is supported by frame support sleeve 16. As frame support sleeve 16 is integrally mounted on support 44, housing 10 remains fixed in relation to support 44 and, hence, base 30.

As best shown in FIGS. 1 and 2, housing 10 has a generally cylindrical shape with a sloping roof or upper portion 11, which slopes downwardly from the center line of the housing. This center line is occupied by shaft 41. The housing 10 also has an upwardly sloping lower portion or floor 12, which slopes upwardly away from the center line. Lower portion or floor 12 has a relatively large central opening which provides access to the ambient air or other media into which the moving gas is to pass. Spokes 14 pass under this central opening and are arranged so as to insubstantially affect the flow of gas being exhausted from the outlet of the plenum 51. If necessary, spokes 14 can be equipped with airfoils to facilitate the flow of gas through the central opening in floor 12.

Roof or upper portion 11 and floor or lower portion 12 are connected by means of a vertical cylindrical wall 20. Thus, roof 11, floor 12 and cylindrical wall 20 enclose blade frame 50. Vertical cylindrical wall 20 is equipped with one or more openings which place the blade frame in communication with the moving gas as shall hereinafter be more fully described.

Shaft mechanism 40 is centrally mounted in the interior of housing 10. At its lower end, shaft 41 is operatively connected to a generator or other energy conversion means in a manner known to those skilled in the art having the benefit of this invention disclosure. Central shaft 41 is telescopically mated through frame support sleeve 16 such that it rotates freely therein. At the other end shaft 41 is journaled into the roof or upper portion 11 of housing 10. As shown in FIG. 1, bearing housing 18 may be mounted on the underside of roof 11 such that shaft 41 is free to rotate with upper shaft bearings 17, yet is held in place by means of plate 19 as well as housing 18.

Blade frame 50 is rotatably mounted in housing 10 by means of lower and upper support flanges 42 and 43, which are integrally mounted on central or output shaft 41. Lower frame support rods 58 and upper frame support rods 62 extend radially from support flanges 42 and 43, respectively. Each rod 62 is mounted at one end on flange 43 and integrally mated at the other end to blade frame 50. In much the same fashion each rod 58 is mounted at one end on flange 42 and integrally mated at the other end to blade frame 50. As the lower and upper frame support rods 58 and 62 are integrally mounted onto lower support flange 42 and upper support flange 43, respectively, rotation of blade frame 50 in turn causes rotation of central or output shaft 41.

Blade frame 50 is formed by upper and lower plenum walls 52 and 53, plenum back wall 59 and outer vertical wall 67. As best shown in FIG. 3, which is a cut-away view showing the exterior of blade frame 50 mounted on shaft mechanism 40, upper plenum wall 52 extends around the circumference of blade frame 50. Similarly, lower plenum wall 53 also extends around the circumference of the blade frame 50. Thus, as shown in FIG. 1, the plenum outlet has an annular shape.

As best shown in FIG. 1, plenum back wall 59, which also extends the circumference of the blade frame, is a continuation of upper plenum wall 52 and is joined thereto by upper arcuate section 63. In much the same fashion, outer vertical plenum wall 67 is a continuation of lower plenum wall 53 which is joined to vertical wall 67 by lower arcuate section 64. Thus, upper plenum wall 52, arcuate section 63 and back wall 59 serve to form one wall of plenum 51; while lower plenum wall 53, arcuate section 62 and outer wall 67 form another wall of the plenum. In accordance with one feature of the present invention the plenum walls are contoured to insure that the discharge blades 55 receive a normalized flow of the moving gas as hereinafter more fully described. Although the plenum walls need not extend continuously or completely around the circumference of the blade frame 50, it is preferable that they do so in order to attain all of the advantages provided by the practice of the present invention.

Housing 10 should cover a sufficient portion of blade frame 50 to insure proper direction of flow of the moving gas and hence insure efficient operation, particularly where the moving gases are ambient wind currents. Housing 10 should also be equipped with one or more inlet ducts 15, as shown in FIG. 2. Each inlet duct 15 places the interior of the housing 10 in communication with the moving gas, such as wind currents, and serves to direct the flow of a moving gas into the plenum 51 and against blade frame 50.

Additionally, in conjunction with one or more inlet ducts 15 cylindrical wall 20 of housing 10 may be equipped with a plurality of substantially vertical openings or slots 22 as shown in FIG. 3. Openings 22 are arranged to sufficiently expose the interior portion of housing 10, including that portion along housing wall 20, to ambient air. This exposure to ambient air substantially reduces or prevents drag caused by the movement of working blades 54 in blade frame 50 close to wall 20. By way of example wall 20 of housing 10 could be equipped with a half-dozen slots 22 along portions of the periphery of housing 10 away from inlet duct 15.

A number of inlet ducts 15 could be attached to housing 10. For example, if it were desired to alternately catch ambient wind currents from different directions, a number of inlet ducts 15 could be provided. Thus, depending upon the direction of the wind currents, moving air would alternately pass through different ducts to impinge upon blades 54 of blade frame 50. However, to enhance efficient operation the ducts 15 should preferably be mounted at approximately 90 degree angles of such other. Alternately, if the moving gas stream were exhaust gases, a single inlet duct 15 could be mounted to efficiently capture the flow of exhaust gases and direct them into blade frame 50.

Plenum walls 52 and 53 preferably slope upwardly as shown in FIG. 1, so that support rods such as 62 form a part of the plenum walls. As rods 62 do not protrude into the plenum 51, unnecessary turbulence and disturbances in the gas flow pattern are avoided. However, an upward slope is not required as long as the plenum or duct 51 is properly contoured to allow a normalized airflow in conjunction with the working and discharge blades.

Secondary or discharge blades 55 are supported by lower frame support rods 58 which are telescopically mated through discharge blades 55 at a point near the leading edge 56 of each discharge blade 55. The number and length of support rods 58 may be varied. As indicated in FIG. 2, support rods 58 need not extend substantially beyond blades 55 unless needed to support the blade frame 50 or working blades 54. Moreover, support rods 58 may not always be necessary to support discharge blades 55.

The discharge blades 55 may be mounted at varying points in the plenum 51. However, in accordance with the present invention the discharge blades should be mounted at a point in the plenum where the flow of a gas stream passing through the duct 51 has normalized due to the contour of the plenum walls such that the discharge blades 55 receive a gas stream with a substantially uniform velocity profile along the length of each blade 55. Since the flow pattern of gas directed against discharge blades 55 is particularly directed, the pitch and general orientation of the blades may be set to best advantage. For example, if blades 55 are airfoils the angle between the direction of the airflow and the chord line of the blades may be substantially predetermined.

Similarly, duct 15 in conjunction with leading edges of plenum walls 52 and 53 act as a flow control means and serve to channel the gas stream in a substantially normalized flow pattern with a substantially uniform cross-sectional velocity profile against working blades 54. As with discharge blades 55, working blades 54 are thus exposed to a substantially normalized airflow with a substantially uniform velocity profile alone the length of each working blade 54. As with blades 55, as the flow pattern of gas directed against working blades 54 is substantially directed and the pitch and general orientation of the blades may be set to best advantage.

The size of an apparatus constructed in accordance with the present invention may be varied depending upon the energy conversion desired and the particular application involved. For example, the outside diameter of the housing 10 may vary over a wide range. Similarly, the internal and other dimensions may be varied as would be known to one skilled in the art having the benefit of this disclosure. For example, referring generally to the embodiment shown in FIG. 1, if the housing diameter were approximately 14 feet it is estimated that the blade pitch diameter—that is the distance from the pivotal axis of one working blade to its counterpart on the other side of the blade frame—could be approximately 12.5 feet. The cross-sectional area of the plenum inlet could then be set at approximately 20 to 25 square feet with each working blade having a height of approximately two and one-half feet and a cord length of approximately one-half foot. The general orientation and arrangement, including pitch, of the blades 54 and 55 could then be set in conjunction with the cross-sectional area of the plenum outlet and the contour of the plenum walls as herein described.

However, regardless of the size of the machine constructed, as the gas or air is uniformly directed against working blades 54 and secondary blades 55, both of which are mounted into blade frame 50, it is possible in accordance with the present invention to obtain more power with a smaller blade or airfoil length than heretofore generally possible. By way of example, if the diameter of blade frame 51 is approximately 14 feet, it is estimated that an apparatus of the present invention could generate as much power as a conventional wind mill having blades with a diameter of approximately 45 feet.

If discharge blade 55 is an airfoil, its leading edge 56 should be oriented in such a fashion that the wind foil force acts consistently with the force on the working or vertical blades 54. For example, in the embodiment of FIGS. 1-3, the leading edge 56 of each discharge blade could be on the upper portion of the blade.

Any standard airfoil may be employed for blades 54 and 55 as would be known to those skilled in the art having the benefit of this disclosure. However, it is preferable to use airfoils adapted for use in moving gases with low velocities. Additionally, it may be preferable to avoid the use of flaps or other mechanisms which would make the blades adjustable, since the pitch and location of the blades 54 and 55 can be important within a fairly narrow range. Additionally, the use of adjustable blades increases the number of moving parts. Also in accordance with the present invention, as the blades 54 and 55 are exposed to a substantially normalized airflow, those blades need not be twisted or turned along their length.

Although the outlet or exhaust of plenum 51 is shown opening downwardly, it may open upwardly, as long as the plenum 51 is properly contoured and discharge blades 55 are located to receive a normalized flow with a substantially uniform cross-sectional velocity profile. However, it is preferable that the exhaust or outlet of plenum 51 be located as shown, since an outlet located on roof 11 of housing 10 would directly expose the secondary blades 55 as well as the interior plenum walls to the elements. This in turn could lead to the undesirable effects, such as the formation of ice on the plenum walls or blades, and so reduce efficiency.

The wind machine of the present invention is estimated to be operable at wind or gas velocities as low as about 3 miles per hour and as high as 100 miles per hour or more. Additionally, an apparatus constructed in accordance with the present invention may be exposed to higher winds if an appropriate device, such as a vibration switch, is provided. However, it is estimated that wind machine of the present invention would have a normal operating range with gas speeds of 5 to 50 mph.

In accordance with another aspect of the present invention directional vanes are unnecessary since the a number of inlet ducts, such as 15, may properly channel the air against the blade frame 50 and through plenum 51. Additionally, straightening vanes to normalize the airflow against either the working blades 54 or the discharge blades 55 are not required, since inlet duct 15 as well as plenum 51 along with housing 10 serve as flow control means to properly direct the gas against blades 54 and 55.

As shown in FIG. 1, plenum back wall 59 ends in an arcuate section or flare 68 which, in conjunction with flared edge or lip 13 of floor 12, serves to promote more efficient flow of air or other gas through plenum 51. Although flared segments 13 and 68 are not necessarily required, it is preferable that they be included, since it is estimated that they add as much as 5 to 6 percent to the overall efficiency of the wind machine.

The volume of the plenum 51 is empirically determined, while the number and pitch of the working blades 54 and discharge blades 55 is optimally balanced to take advantage of particular characteristics of the moving gas stream, such as typical density, velocity and temperature. The volume of the plenum and the arrangement of the blades is such that the back pressure on the working blades 56 is dissipated or eliminated and efficient operation is obtained. More particularly, the cross-sectional area of the plenum inlet and the plenum outlet along with the contour of the plenum walls are set in conjunction with the pitch and number of the blades 54 and 55.

In accordance with one aspect of the present invention the area of the inlet may be varied in relation to the area of the outlet depending upon the pitch of the blades. The smaller the output area for a given input area, the greater the pitch generally required for the discharge blades 55 since nearly the same amount of gas must be discharged from the plenum outlet as enters the plenum inlet by way of inlet duct 15. Otherwise, back pressure may develop against working blades 54, thus impairing efficiency. By way of example, for an inlet area of approximately 20 square feet the outlet should be approximately 20 square feet, and preferably less depending upon the pitch of the blades. The pitch of the working blades 54 may, by way of example, vary from about 5 to 15 degrees, while the pitch of the discharge blades 55 may, by way of example, vary between about 10 and approximately 30 to 45 degrees. Additionally, the number of the discharge and working blades may be varied in relation to each other with the number of discharge blades generally being smaller than the number of working or vertical blades. However, the number of discharge blades in relation to the working blades may be increased if the pitch of the discharge blades is reduced.

The pitch of the blades along with the inlet and outlet cross-sectional areas and contour of the plenum walls, and hence volume of the plenum, may be varied depending upon the characteristics of the moving gas stream. For example, given identical average wind speeds if the apparatus is to be used in ambient air currents at sea level a less steep pitch would generally be required for the discharge blades than for the same apparatus located at an altitude of 10,000 feet in a relatively dry climate.

In operation working blades 54 and discharge blades 55 are preferably integrally mounted on blade frame 50. The orientation of those blades is empirically set in conjunction with the cross-sectional area of the plenum inlet and plenum outlet as well as the contour of the plenum walls. The relative cross-sectional areas of the plenum inlet and outlet in turn are varied depending upon the use of the wind machine, the power desired and the characteristics of the gas stream.

Appropriate flow control means, such as housing 10 with an opening to place the plenum inlet in communication with the moving gases, are also provided. The exact arrangement of the flow control means may be varied depending upon the nature and source of the moving gas stream. For example, more than one inlet duct may be provided or the contour of the plenum walls may be varied.

Once the housing and the blade frame have been mounted, central or output shaft 41 is operatively connected to an appropriate energy conversion means, such as an electrical generator. The blade frame 50 is then placed in communication with a source of moving gas such as ambient wind currents. The moving gas stream is directed against working blades 54, which cause blade frame 50 to rotate, hence turning output shaft 41. The rotation of blade frame 50 in turn causes the rotation of discharge blades 55, such that any back pressure on working blades 54 is dissipated or eliminated and the flow of the moving gas through and out the plenum is facilitated.

The gas stream may either be wind or any other moving gas stream such as the exhaust from a fan or blowers in a plant.

The housing 10, and blade frame 50 may be constructed out of any suitable material as is known to those skilled in the art having the benefit of this disclosure. However, the weight of the blade frame should be sufficient to place a proper amount of torque on the working shaft but be light enough to facilitate efficient operation. Additionally, upper shaft bearings 17 preferably substantially reduce the friction caused by the rotation of shaft 41.

The foregoing description has been directed to a particular preferred embodiment in accordance with the requirements of the patent statutes for the purpose of illustration and explanation. It will be apparent, however, to those skilled in the art that many modifications and changes in the apparatus and procedures set forth will be possible without departing from spirit and scope of the invention. It is the applicant's intention that the following claims be interpreted to embrace all such modifications and variations.

What is claimed is:

1. An apparatus for converting energy from a moving gas stream comprising:
   a rotatable frame mounted on a rotatable shaft and having a plenum with an inlet and an outlet, said frame being fixed in relation to the rotatable shaft to thereby rotate the shaft upon movement of the frame;
   a series of working blades mounted across the plenum in close proximity to the plenum inlet;
   a series of discharge blades mounted across the plenum at a location sufficiently downstream of the working blades such that the arrangement of the discharge blades materially reduces any back pressure on the working blades; and
   flow control means fixed in relation to the frame and the moving gas stream, said flow control means being operatively connected to the frame for guiding the flow of the moving gas stream into the plenum inlet in a direction generally normal to the working blades without substantially diverting the general flow of the moving gas stream prior to impingement of the moving gas stream on the working blades.

2. An apparatus according to claim 1 wherein the working and discharge blades comprise conventional low speed airfoils.

3. An apparatus according to claim 1 wherein the leading edge of the walls of the plenum inlet comprise arcuate segments contoured to direct a normalized flow of gas against the discharge blades without substantially diverting the general flow of the moving gas stream prior to its impingement on the discharge blades.

4. An apparatus according to claim 1 wherein the flow control means comprises a housing.

5. An apparatus according to claim 4 wherein the flow control means comprises a housing having at least one inlet duct and one or more arcuate segments extending from the outlet of the plenum, said arcuate segments being configured to facilitate a normalized flow of gas on the working blades.

6. The apparatus of claim 4 further comprising a plurality of apertures selectively located along a portion of the housing in spaced relation to the plenum inlet and plenum outlet for placing the frame in communication with ambient air.

7. The apparatus of claim 1 wherein the plenum inlet is at an angle of approximately ninety degrees with respect to the plenum outlet and wherein the cross-sectional area of the plenum diverges and converges as it goes from the plenum inlet to the plenum outlet at a point between the working blades and the discharge blades.

8. The apparatus of claim 7 wherein the plenum outlet is generally perpendicular to the general direction of the flow of the moving gas stream.

9. The apparatus of claim 1 wherein the number of discharge blades is less than the number of working blades.

10. The apparatus of claim 1 wherein the pitch of the discharge blades is greater than the pitch of the working blades.

11. An apparatus for converting energy from a moving gas stream comprising:
 a fixed housing having at least one inlet and an outlet in spaced relation to each inlet;
 a frame mounted in the housing to rotate a shaft operatively connected to the frame and having a plenum with an inlet and an outlet, the plenum inlet and outlet being in generally undiverted fluid communication with the housing inlets and outlet, respectively;
 a series of working blades fixedly mounted across the plenum in general proximity of the plenum inlet to thereby be capable of receiving a generally undiverted flow of moving gas; and
 a series of discharge blades fixedly mounted across the plenum at a fixed distance from the plenum outlet, the arrangement of the discharge blades being sufficient to materially reduce any back pressure on the working blades.

12. An apparatus according to claim 11 comprising a generally circumferential housing and wherein the plenum inlet extends substantially around the circumference of the housing and a duct is mounted on the housing in direct fluid communication with the plenum inlet.

13. An apparatus according to claim 11 wherein the pitch of the discharge blades is fixed in relation to the cross-sectional areas of the plenum inlet and plenum outlet to thereby facilitate reduction of any back pressure on the working blades for a given moving gas stream.

14. An apparatus for converting energy from a moving gas stream comprising:
 a fixed housing having at least one inlet and an outlet in spaced relation to all of the inlets;
 a shaft rotatably mounted at one end in the housing, the other end of the shaft being adapted for operative connection to a generator;
 a generally circular frame amounted on the shaft and defining an internal plenum, the frame having a plenum inlet generally in a plane perpendicular to the moving gas stream passing through the housing inlet and in direct fluid communication with each housing inlet and a plenum outlet generally in a plane parallel to the moving gas stream passing through the housing inlet and in fluid communication with the housing outlet such that the plenum defines at least one bend;
 a series of working blades fixedly mounted across the inlet of the plenum for direct exposure to a generally undiverted stream of the moving gas; and
 a series of discharge blades fixedly mounted across the plenum at a location between the plenum outlet and the bend in the plenum, the location and orientation of the discharge blades being fixed in relation to the orientation and location of the working blades, the cross-sectional area of the plenum and the cross-sectional area of each housing inlet and the housing outlet for efficient conversion of the energy of the moving gas stream as it impinges upon the working blades.

15. An improved method of converting a portion of the energy from a moving gas stream comprising:
 arranging a series of working blades on a frame such that a moving gas impinging on the working blades will rotate the frame;
 arranging a plurality of discharge blades on the frame in order to materially reduce any back pressure on the working blades when the working blades are exposed to a moving gas;
 normalizing a flow of the gas stream to form a normalized gas stream which generally flows in a direction normal to the working blades; and
 exposing the working blades to the normalized gas stream thereby rotating the frame and causing the discharge blades to rotate such that the discharge blades materially reduce the back pressure within the frame in order to enhance the efficient conversion of the energy in the moving gas stream.

16. The method of claim 15 further comprising the step of fixedly attaching the frame to a rotatable shaft prior to exposing the frame to the moving gas.

17. An apparatus for converting energy from a moving gas stream comprising:
 a fixed housing having a roof, a generally cylindrical wall extending around the circumference of the housing and at least one housing inlet and one housing outlet, the housing oulet being located on the housing at a point opposite the roof and the housing inlet being located on the generally cylindrical wall in spaced relation to the housing outlet;
 a rotatable shaft mounted for rotation in the housing;
 a generally cylindrical frame mounted on the rotatable shaft for rotation in the housing, the frame having a plenum with a plenum outlet in direct fluid communication with the housing outlet and a plenum inlet extending substantially around the circumference of the frame and configured to allow at least a portion of the plenum inlet to always be in fluid communication with a plenum inlet, at least one of said plenum inlets being configured to form an opening having outwardly facing arcuate edges for normalizing the flow of the moving gas stream as it enters the plenum and the cross-sectional area of the plenum diverging as it goes from the plenum inlet to the plenum outlet at a point between the plenum inlet and plenum outlet;

a series of working blades fixedly mounted across the plenum in proximity to the plenum inlet and upstream of the diverging cross-sectional area of the plenum, said working blades being configured to receive a normalized direct flow of moving gas at the location where they are mounted; and a series of discharge blades mounted across the plenum in spaced relation from the plenum outlet and at a location downstream of the diverging cross-sectional area of the plenum, said discharge blades being configured to encounter a normalized direct flow of moving gas and materially reduce any back pressure on the working blades.

18. An improved method of converting a portion of the energy from a moving gas stream comprising:

normalizing the flow of the gas stream to form a normalized gas stream which has a generally uniform velocity profile and which generally flows in a direction normal to a plurality of at least generally vertical working blades;

exposing a portion of the working blades to the normalized gas stream prior to substantially altering the direction of flow of the normalized gas stream to thereby cause working blades to move out of and into the normalized gas stream;

confining the gas stream to a predetermined path and flow volume while concurrently altering the direction of flow of the gas stream to a direction generally normal to a plurality of at least generally horizontal discharge blades;

normalizing the flow of the gas stream to again form a normalized gas stream which generally flows in a direction normal to the plurality of discharge blades;

exposing all or a portion of the discharge blades to the normalized gas stream; and thereafter confining the gas stream to a predetermined path for a sufficient distance beyond the discharge blades to allow the gas stream to recover a portion of its velocity and reduce any back pressure on the working blades, thereby facilitating movement of the working blades into and out of the normalized gas stream.

19. A process according to claim 18 further comprising the step of setting the pitch of the working blades and discharge blades to facilitate movement of the working blades into and out of the normalized gas stream.

20. The method of claim 18 wherein the velocity of the moving gas directed against the working blades is at least about 3 miles per hour.

21. The method of claim 18 wherein the moving gas is an exhaust gas.

* * * * *